United States Patent
Park et al.

(10) Patent No.: US 8,043,986 B2
(45) Date of Patent: Oct. 25, 2011

(54) SEALING GLASS COMPOSITION, METHOD AND ARTICLE

(75) Inventors: Dong-Sil Park, Niskayuna, NY (US); Jian Wu, Freemont, CA (US); Mamatha Nagesh, Karnataka (IN); Sundeep Kumar, Karnataka (IN); Craig Stringer, DuBois, PA (US); Digamber Porob, Goa (IN); Vinayak Hassan Vishwanath, Karnataka (IN)

(73) Assignee: General Electric Company, Schenectady, NY (US)

( * ) Notice: Subject to any disclaimer, the term of this patent is extended or adjusted under 35 U.S.C. 154(b) by 304 days.

(21) Appl. No.: 12/270,258

(22) Filed: Nov. 13, 2008

(65) Prior Publication Data
US 2010/0120602 A1    May 13, 2010

(51) Int. Cl.
*C03C 8/24* (2006.01)
*C03C 3/091* (2006.01)
*C03C 3/093* (2006.01)
*C03C 3/083* (2006.01)
*C03C 3/064* (2006.01)
*H01M 2/18* (2006.01)
*H01M 2/08* (2006.01)

(52) U.S. Cl. ............ 501/15; 501/66; 501/67; 501/68; 501/77; 429/139; 429/174; 429/185

(58) Field of Classification Search ............ 501/65, 501/66, 67, 68, 69, 70, 14, 15, 77; 429/122, 429/139, 171, 174, 180, 181, 185
See application file for complete search history.

(56) References Cited

U.S. PATENT DOCUMENTS

| 4,132,820 | A |   | 1/1979  | Mitoff              |        |
|-----------|---|---|---------|---------------------|--------|
| 4,199,340 | A |   | 4/1980  | Topping et al.      |        |
| 4,239,838 | A |   | 12/1980 | Miller et al.       |        |
| 4,268,313 | A | * | 5/1981  | Park et al.         | 501/15 |
| 4,294,897 | A |   | 10/1981 | Bindin              |        |
| 4,341,849 | A |   | 7/1982  | Park et al.         |        |
| 4,375,127 | A |   | 3/1983  | Elkins et al.       |        |
| 4,565,791 | A | * | 1/1986  | Boudot et al.       | 501/56 |
| 5,112,777 | A |   | 5/1992  | MacDowell           |        |
| 5,134,044 | A |   | 7/1992  | Megerle             |        |
| 5,158,840 | A |   | 10/1992 | Megerle             |        |
| 5,179,047 | A | * | 1/1993  | Chiba               | 501/15 |
| 5,194,337 | A |   | 3/1993  | Yoshida et al.      |        |
| 5,397,366 | A |   | 3/1995  | Ali et al.          |        |

(Continued)

FOREIGN PATENT DOCUMENTS

GB    2035995 A    10/1978

(Continued)

OTHER PUBLICATIONS

Ghosh, et al. "Glass-Ceramic Sealants for Planar IT-SOFC: A Bilayered Approach for Joining Electrolyte and Metallic Interconnect." Journal of The Electrochemical Society, 155 (5) pp. B473-B478. 2008.

(Continued)

*Primary Examiner* — Jerry A Lorengo
*Assistant Examiner* — Noah Wiese
(74) *Attorney, Agent, or Firm* — GE Global Patent Operation; Catherine J. Winter

(57) ABSTRACT

A sealing glass for an energy storage device is provided. The sealing glass includes silicon dioxide, boron oxide, aluminum oxide, sodium oxide and zirconium oxide. Methods for preparing the sealing glass and the energy storage device incorporating the sealing glass are also provided.

21 Claims, 1 Drawing Sheet

U.S. PATENT DOCUMENTS

| | | | |
|---|---|---|---|
| 5,747,399 A * | 5/1998 | Kosokabe et al. | 501/67 |
| 5,750,279 A | 5/1998 | Carolan et al. | |
| 5,849,649 A * | 12/1998 | Poole | 501/26 |
| 6,207,321 B1 | 3/2001 | Fukagawa et al. | |
| 6,525,300 B1 * | 2/2003 | Mitra et al. | 219/443.1 |
| 6,635,592 B1 * | 10/2003 | Kosokabe et al. | 501/14 |
| 6,828,263 B2 | 12/2004 | Larsen et al. | |
| 6,902,798 B2 | 6/2005 | Ghosh et al. | |
| 7,214,441 B2 | 5/2007 | Cortright et al. | |
| 2005/0147866 A1 | 7/2005 | Ko et al. | |
| 2006/0115690 A1 | 6/2006 | Crosbie | |

FOREIGN PATENT DOCUMENTS

| | | |
|---|---|---|
| JP | 11147733 A | 6/1999 |

OTHER PUBLICATIONS

Ghosh, et al. "Microstructure and Property Evaluation of Barium Aluminosilicate Glass-Ceramic Sealant for Anode-Supported Solid Oxide Fuel Cell." Journal of the European Ceramic Society 28 (2008) pp. 69-76.

* cited by examiner

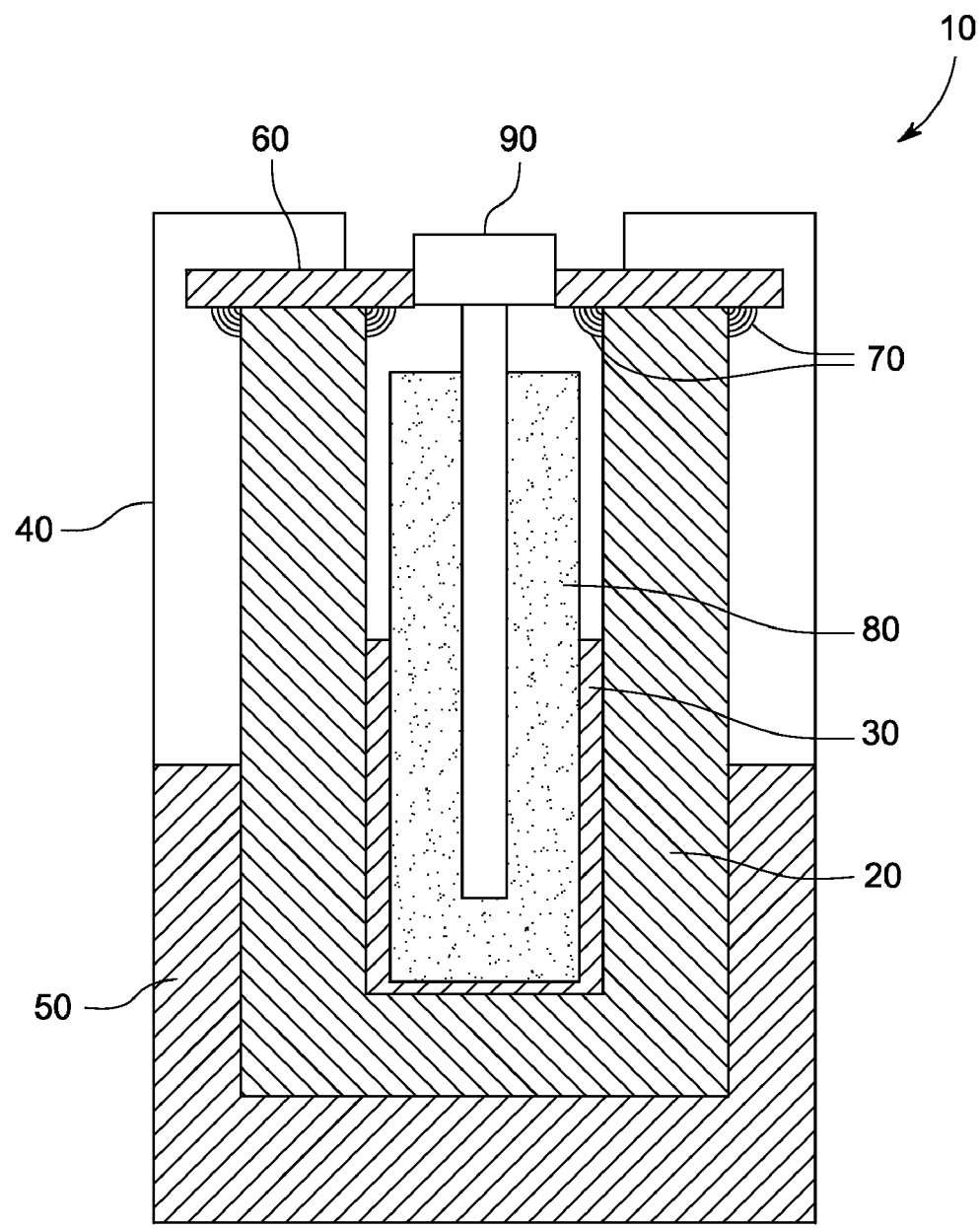
FIGURE

SEALING GLASS COMPOSITION, METHOD AND ARTICLE

FIELD OF THE INVENTION

This invention includes embodiments that relate to a sealing glass. The invention includes embodiments that relate to an article made using the sealing glass.

BACKGROUND OF THE INVENTION

Sealing glasses may be used in sodium/sulfur or sodium/metal halide batteries to seal ceramic components together. The components can include an electrically insulating alpha-alumina collar and an ion-conductive electrolyte beta-alumina tube. The sealing glass should join ceramic components and maintain the seal by having a proper wetting behavior, a similar thermal expansion property and a good strength, among other requirements. During sealing, ionic interdiffusion between the glass and the ceramic components can occur leading to undesirable effects, such as cell resistance increase and devitrification of the glass, which can cause a change in the thermal expansion property of the sealing glass and contribute to seal failure. Commercial sealing glasses may not meet the complex set of requirements necessary in a sodium battery operated at 300 to 400 degrees Celsius for an extended period of time, which can be for as long as 20 years.

The sealing glass should withstand high temperatures and corrosive environments. During operation of the battery, the sealing glass may contact with molten or gaseous sodium or halides of various compositions, such as tetrachloroaluminate, which can corrode the glass and break down the seal. These sealing glasses may not resist sodium and halide exposure at operating temperatures and may corrode.

It may be desirable to have a sealing glass composition that has properties and characteristics that differ from those materials that are currently available.

SUMMARY OF THE INVENTION

In one embodiment, a sealing glass for a sodium battery, said sealing glass including silicon dioxide, boron oxide, aluminum oxide, sodium oxide and zirconium oxide. In one embodiment, an energy storage device incorporates the sealing glass.

In one embodiment, a method for making a sealing glass for a sodium battery, said method including blending silicon dioxide, boron oxide, aluminum oxide, sodium oxide and zirconium oxide to form a blend and forming a glass seal from the blend to join a first battery component to a second battery component.

Various embodiments may provide sealing glasses that are able to withstand corrosive environments. The sealing glass may increase the lifetime of the battery. The sealing glasses may have good sodium and halide resistance at operating temperatures, as well as complimentary mechanical properties, stability at high temperatures, and thermal expansion properties relative to ceramic components.

BRIEF DESCRIPTION OF DRAWINGS

The FIGURE is a schematic diagram depicting an exemplary embodiment of a sodium-metal halide battery cell.

DETAILED DESCRIPTION

This invention includes embodiments that relate to a sealing glass composition. The invention includes embodiments that relate to an article made using the sealing glass composition. The sealing glass composition can include oxides of silicon, aluminum, sodium, zirconium and boron. The sealing glass may optionally include alkaline earth oxides, such as calcium oxide, strontium oxide and barium oxide.

As used herein, sealing glass refers to a composition that can seal and is glassy. Seal is a function performed by a structure that helps join other structures together to reduce or prevent leakage through the joint of the other structures. Glassy refers to a vitreous solid or an inorganic product of fusion that has been cooled to a rigid condition without some or any crystallizing (i.e., is amorphous to some determined extent).

In one embodiment, a sealing glass for a sodium battery, said sealing glass including silicon dioxide, boron oxide, aluminum oxide, sodium oxide and zirconium oxide. Each of the components of a sealing glass contributes to multiple properties in the sealing glass, such as thermal expansion, working point and corrosion resistance. Some of the properties are described below.

As a glass former, silicon dixoide provides a matrix for the sealing glass and improves its corrosion resistance to halides. In one embodiment, silicon dioxide is present from about 30 weight percent to about 70 weight percent, based on the weight of the sealing glass. In another embodiment, silicon dioxide is present from about 40 weight percent to about 70 weight percent, based on the weight of the sealing glass. In another embodiment, silicon dioxide is present from about 40 weight percent to about 65 weight percent, based on the weight of the sealing glass. In one embodiment, silicon dioxide is present in a range of from about 30 weight percent to about 40 weight percent, based on the weight of the sealing glass. In another embodiment, silicon dioxide is present in an amount in a range of from about 40 weight percent to about 50 weight percent, based on the weight of the sealing glass. In another embodiment, silicon dioxide is present in an amount in a range of from about 50 weight percent to about 65 weight percent, based on the weight of the sealing glass. In another embodiment, silicon dioxide is present in an amount in a range of from about 65 weight percent to about 70 weight percent, based on the weight of the sealing glass. Another suitable range for the amount of silicon dioxide is less than about 70 weight percent, based on the weight of the sealing glass. Another suitable range for the amount of silicon dioxide is more than about 30 weight percent, based on the weight of the sealing glass.

Boron oxide is a glass former. The presence of boron oxide may influence the working point of the glass composition. Controlling the amount of boron oxide present provides control over the thermal expansion properties, and, in combination with aluminum oxide can affect or improve the sodium resistance for the sealing glass. In one embodiment, boron oxide is present from about 10 weight percent to about 40 weight percent, based on the weight of the sealing glass. In another embodiment, boron oxide is present from about 10 weight percent to about 30 weight percent, based on the weight of the sealing glass. In another embodiment, boron oxide is present from about 15 weight percent to about 25 weight percent, based on the weight of the sealing glass. In another embodiment, boron oxide is present from about 20 weight percent to about 30 weight percent, based on the weight of the sealing glass. In one embodiment, boron oxide is present in a range of from about 10 weight percent to about 15 weight percent, based on the weight of the sealing glass. In another embodiment, boron oxide is present in an amount in a range of from about 15 weight percent to about 20 weight percent, based on the weight of the sealing glass. In another embodiment, boron oxide is present in an amount in a range of from about 20 weight percent to about 25 weight percent, based on the weight of the sealing glass. In another embodiment, boron oxide is present in an amount in a range of from about 25 weight percent to about 30 weight percent, based on the weight of the sealing glass. In another embodiment, boron oxide is present in an amount in a range of from about 30 weight percent to about 40 weight percent, based on the weight of the sealing glass. Another suitable range for the amount of boron oxide is less than about 40 weight percent, based on the weight of the sealing glass. Another suitable range for the amount of boron oxide is more than about 5 weight percent, based on the weight of the sealing glass.

Control over the amount of aluminum oxide can influence the mechanical stability and resistance towards sodium and halide corrosion of the sealing glass. In one embodiment, aluminum oxide is present from about 5 weight percent to about 30 weight percent, based on the weight of the sealing glass. In another embodiment, aluminum oxide is present from about 5 weight percent to about 20 weight percent, based on the weight of the sealing glass. In one embodiment, aluminum oxide is present in a range of from about 5 weight percent to about 10 weight percent, based on the weight of the sealing glass. In another embodiment, aluminum oxide is present in an amount in a range of from about 10 weight percent to about 20 weight percent, based on the weight of the sealing glass. In another embodiment, aluminum oxide is present in an amount in a range of from about 20 weight percent to about 30 weight percent, based on the weight of the sealing glass. Another suitable range for the amount of aluminum oxide is less than about 30 weight percent, based on the weight of the sealing glass. Another suitable range for the amount of aluminum oxide is more than about 10 weight percent, based on the weight of the sealing glass.

Sodium oxide content can influence the resistance to sodium corrosion, working temperature of the glass, and the thermal expansion properties. In one embodiment, sodium oxide is present from about 6 weight percent to about 16 weight percent, based on the weight of the sealing glass. In another embodiment, the sodium oxide is present from about 9 weight percent to about 16 weight percent, based on the weight of the sealing glass. In one embodiment, sodium oxide is present in an amount in a range of from about 6 weight percent to about 9 weight percent, based on the weight of the sealing glass. In another embodiment, the sodium oxide is present in an amount in a range of from about 9 weight percent to about 10 weight percent, based on the weight of the sealing glass. In another embodiment, sodium oxide is present in an amount in a range of from about 10 weight percent to about 15 weight percent, based on the weight of the sealing glass. In another embodiment, sodium oxide is present in an amount in a range of from about 15 weight percent to about 16 weight percent, based on the weight of the sealing glass. In other embodiments, the sodium oxide may be present in an amount in a range of from about 6 weight percent to about 8 weight percent, from about 8 weight percent to about 10 weight percent, from about 10 weight percent to about 12 weight percent, from about 12 weight percent to about 14 weight percent, or from about 14 weight percent to about 16 weight percent, based on the weight of the sealing glass. Another suitable range for the amount of sodium oxide is less than about 16 weight percent, based on the weight of the sealing glass. Another suitable range for the amount of sodium oxide is more than about 6 weight percent, based on the weight of the sealing glass.

The presence and amount of zirconium oxide can influence the halide resistance of the sealing glass by forming a zirconium hydroxide layer. The layer may function as a barrier towards diffusion of ionic species, which is believed to control the early stages of sealing glass degradation. Zirconium oxide may be present as zirconium oxide or may be present as a variant of zirconium oxide, such as yttria-stabilized zirconium oxide. Zirconium oxide is present in any amount suitable for improving halide resistance of the sealing glass composition. In one embodiment, zirconium oxide is present in an amount in a range of from about 0.1 weight percent to about 10 weight percent, based on the weight of the sealing glass. In another embodiment, zirconium oxide is present in an amount in a range of from about 1 weight percent to about 5 weight percent, based on the weight of the sealing glass. The zirconium oxide, in differing embodiments, may be present in an amount that is less than 10 weight percent, less than 5 weight percent, or in a range of from 0.5 weight percent to about 1 weight percent, from 1 weight percent to about 2 weight percent, from 2 weight percent to about 3 weight percent, from 3 weight percent to about 4 weight percent, from 4 weight percent to about 5 weight percent, or from 5 weight percent to about 10 weight percent, based on the weight of the sealing glass.

The sealing glass may optionally include alkaline earth oxides. In one embodiment, the suitable alkaline earth oxide can include, but is not limited to, calcium oxide, strontium oxide and barium oxide. In one embodiment, the sealing glass includes up to about 10 weight percent of an alkaline earth oxide, based on the weight of the sealing glass. In another embodiment, the sealing glass includes up to about 8 weight percent of an alkaline earth oxide, based on the weight of the sealing glass. Other suitable amounts of alkaline earth oxide may be in the ranges of from about 1 weight percent to about 3 weight percent, from about 3 weight percent to about 5 weight percent, from about 5 weight percent to about 7 weight percent, or from about 7 weight percent to about 10 weight percent. In one embodiment, the sealing glass includes up to about 10 weight percent calcium oxide, based on the weight of the sealing glass. In a specific embodiment, the sealing glass includes up to about 8 weight percent calcium oxide, based on the weight of the sealing glass. In a specific embodiment, the sealing glass includes up to about 10 weight percent strontium oxide, based on the weight of the sealing glass. In a specific embodiment, the sealing glass includes up to about 8 weight percent strontium oxide, based on the weight of the sealing glass. In a specific embodiment, the sealing glass includes up to about 10 weight percent barium oxide, based on the weight of the sealing glass. In a specific embodiment, the sealing glass includes up to about 8 weight percent barium oxide, based on the weight of the sealing glass.

The sealing glass may have a thermal expansion property that makes it compatible with the ceramic components to be sealed in the sulfur/sodium or sodium/metal halide battery. In one embodiment, the sealing glass composition has a coefficient of thermal expansion at 20 degrees Celsius to 350 degrees Celsius of from about 5.0 ppm/° C. to about 8.0 ppm/° C. In another embodiment, the sealing glass composition has a coefficient of thermal expansion from about 5.5 ppm/° C. to about 7.5 ppm/° C. In one embodiment, the sealing glass composition has a coefficient of thermal expansion in the range of from about 20 degrees Celsius to about 350 degrees Celsius of from about 5.0 ppm/° C. to about 5.5 ppm/° C. In another embodiment, the sealing glass composition may have a coefficient of thermal expansion in that temperature range of from about 7.5 ppm/° C. to about 8 ppm/° C.

The sealing glasses have good stability and chemical resistance may be within determined parameters at a determined operating temperature. In one embodiment, the sealing glass has a glass transition temperature of at least about 500 degrees Celsius. In another embodiment, the glass transition temperature is at least about 550 degrees Celsius. In one embodiment, the glass transition temperature is less than about 700 degrees Celsius. In another embodiment, the glass transition temperature is in a range of from about 500 degrees Celsius to about 700 degrees Celsius. In another embodiment, the glass transition temperature is in a range of from about 550 degrees Celsius to about 700 degrees Celsius. In another embodiment, the glass transition temperature is in a range of from about 590 degrees Celsius to about 680 degrees Celsius. In another embodiment, the glass transition temperature is in a range of from about 500 degrees Celsius to about 550 degrees Celsius. In another embodiment, the glass transition temperature is in a range of from about 550 degrees Celsius to about 590 degrees Celsius. In another embodiment, the glass transition temperature is from about 590 degrees Celsius to about 680 degrees Celsius. In another embodiment, the glass transition temperature is from about 680 degrees Celsius to about 700 degrees Celsius.

In one embodiment, the glass transition temperature is in a range of from about 550 degrees Celsius to about 560 degrees Celsius. In one embodiment, the glass transition temperature is in a range of from about 560 degrees Celsius to about 590 degrees Celsius. In one embodiment, the glass transition temperature is in a range of from about 680 degrees Celsius to about 690 degrees Celsius. In one embodiment, the glass transition temperature is in a range of from about 690 degrees Celsius to about 700 degrees Celsius.

In one embodiment, the sealing glass includes from about 30 weight percent to about 70 weight percent silicon dioxide, from about 10 weight percent to about 40 weight percent boron oxide, from about 5 weight percent to about 30 weight percent aluminum oxide, from about 6 weight percent to about 16 weight percent sodium oxide, from about 1 weight percent to about 10 weight percent zirconium oxide and up to about 10 weight percent of an alkaline earth oxide.

In another embodiment, the sealing glass includes from about 40 weight percent to about 70 weight percent silicon dioxide, from about 10 weight percent to about 30 weight percent boron oxide, from about 5 weight percent to about 20 weight percent aluminum oxide, from about 6 weight percent to about 15 weight percent sodium oxide, from about 1 weight percent to about 10 weight percent zirconium oxide and up to about 10 weight percent of an alkaline earth oxide.

In another embodiment, the sealing glass includes from about 40 weight percent to about 65 weight percent silicon dioxide, from about 15 weight percent to about 25 weight percent boron oxide, from about 5 weight percent to about 20 weight percent aluminum oxide, from about 6 weight percent to about 15 weight percent sodium oxide, from about 1 weight percent to about 10 weight percent zirconium oxide and up to about 10 weight percent of an alkaline earth oxide.

In another embodiment, the sealing glass includes from about 40 weight percent to about 50 weight percent silicon dioxide, from about 20 weight percent to about 30 weight percent boron oxide, from about 10 weight percent to about 20 weight percent aluminum oxide, from about 10 weight percent to about 15 weight percent sodium oxide, from about 1 weight percent to about 5 weight percent zirconium oxide and up to about 8 weight percent of an alkaline earth oxide.

A method for making a sealing glass for a sodium battery may include blending silicon dioxide, boron oxide, aluminum oxide, sodium oxide and zirconium oxide (or precursors thereof) and melting the oxides to form a homogenous composition. The sealing glass may include alkaline earth oxides. The oxides and ranges are described above. The silicon dioxide, boron oxide, aluminum oxide, sodium oxide, zirconium oxide and optionally, alkaline earth oxides, may be mixed and melted to form the sealing glass composition. The oxides may be melt-blended to form the sealing glass composition. The temperature for the melt blend may be in a range of from about 1300 degrees Celsius to about 1700 degrees Celsius.

In one embodiment, a homogenous glass composition including silicon dioxide, boron oxide, aluminum oxide, sodium oxide and optionally, alkaline earth oxides, may be prepared and zirconium oxide powder may be mixed with the homogeneous glass to form a glass-zirconium oxide powder composite. The zirconium oxide powder may be zirconium oxide, yttria-stabilized zirconium oxide or a mixture of zirconium oxide with another ceramic powder, such as alpha-alumina.

The molten glass is cooled to prepare a homogenous sealing glass composition. In one embodiment, the molten glass is cooled at room temperature. In another embodiment, the molten glass composition is quenched between stainless steel plates at room temperature. In one embodiment, the quenched glass may be crushed into particles having predetermined particle sizes, to form frit glass powder.

The molten glass composition may be poured into a mold to form a desired shape, such as a block, and cooled to room temperature to provide a molded sealing glass. In one embodiment, the materials are pre-mixed as powders and are formed into a seal structure, in situ, in contact with the components to be sealed.

In one embodiment, a sodium battery incorporates a sealing glass including silicon dioxide, boron oxide, aluminum oxide, sodium oxide and zirconium oxide. The sodium battery may optionally include alkaline earth oxides. The oxides and ranges are described above.

Sodium-sulfur or sodium/metal halide batteries may contain a sealing glass in a ceramic-to-ceramic seal structure that secures an electrically insulating collar and an ion-conductive electrolyte tube (separator). In another embodiment, the ion-conductive electrolyte may have a different shape, such as a plate or cone.

The ceramic collar can fit onto the electrolyte tube and is sealed with the sealing glass. In one embodiment, the collar is positioned around and adjacent to an open end of the electrolyte tube. In another embodiment, the collar has a lower inner portion that abuts against the outer wall of the tube and has an upper portion that is recessed. The collar and electrolyte tube may be temporarily held together with an assembly until it is sealed.

The electrolyte tube includes ion-conductive materials, such as beta-alumina. The collar includes electrically insulating materials, such as alpha-alumina.

The sealing glass may be applied to the collar and the electrolyte tube to seal the ceramic components together. In one embodiment, the sealing glass is ground into small particle sizes. In one embodiment, the glass particles of the sealing glass are positioned in the recess between the inner surface of the electrolyte tube and the upper portion of the adjacent collar. The sealing glass particles are heated to a temperature of about 1000° C. in air or a controlled atmosphere, such as oxygen or nitrogen, to melt the glass particles. The assembly is then cooled to room temperature with a resulting sealing glass sealing the collar to the inner wall of the tube.

The FIGURE is a schematic diagram depicting an exemplary embodiment of a sodium-metal halide battery cell 10. The sodium-halide battery cell 10 has an ion-conductive electrolyte tube 20, which may be a β-alumina, a negative electrode chamber 30, a cell case 40 filled with sodium 50 arranged at the outside of the solid electrolyte tube 20, a negative electrode terminal tube 90 and an insulative ceramic collar 60, which may be made of an α-alumina. The negative electrode chamber 30 contains a halide, which is arranged at the outside of the electrolyte tube 20 and a cathode 80. The ceramic collar 60 is joined to the upper end of the outer circumferential surface of the electrolyte tube 20 by means of a sealing glass 70, which is described above.

EXAMPLES

The following example illustrates methods and embodiments in accordance with the invention, and does not limit the claims. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Example 1

Sealing glass compositions are prepared by mixing thoroughly, by ball milling, silicon dioxide, aluminum oxide (99.99% Inframat), boron oxide (99%, Sigma-Aldrich), sodium oxide and zirconium oxide in the amounts shown in Table 1. The ball-milled mixture is placed in a platinum crucible and melted in a glass-melting furnace at a temperature of 1500 degrees Celsius for 30 minutes in an air atmosphere to provide molten glass. The molten glass is quenched between two stainless steel plates in air at room temperature to form a mass. The quenched glass mass is formed into a glass frit by crushing the glass mass. The glass frit is then applied to a gap between two ceramic parts to be joined and heated to an elevated temperature where the molten glass wets and joins the two parts.

Glass transition temperatures of the glasses are measured using DTA/TGA Seysys 16/18 (France). The glasses were annealed below their glass transition temperatures for 10 hours. The amorphous nature of the glass samples was confirmed using X-ray diffraction (CuKα; PANalytical, Netherlands). Coefficient of thermal expansion measurements are measured for each glass sample using a dilatometer (DIL 402C, Netzsch, Germany) between room temperature and 600° C. Sapphire is used as the calibration standard. Results are shown in Table 1.

Density is calculated from SciGlass© software for each sample and is shown in Table 1.

Working points are determined by sealing alpha and beta ceramic bodies with the glass seal composition in controlled environments to temperatures for which suitable wetting characteristics and glass seal microstructures are observed (typically in the range $10^4$ Poise in viscosity). Working points are shown in Table 1.

Example 2

Samples CE-1, CE-2 and 5 are tested for sodium resistance in an accelerated corrosion test. The glass samples are immersed in sodium melt for one week at 350° C. and at 425° C. A capsule is designed using Swagelok® parts made of stainless steel, SS316, with VCR® fittings. To ensure a leak proof capsule, a gasket made of stainless steel, SS316L, is used. The capsule is loaded inside a nitrogen-filled glove box (moisture <0.1 ppm and oxygen <0.1 ppm). Two glass pieces are loaded inside one capsule with two sodium cubes (99.99%, Sigma-Aldrich). The glass pieces are completely immersed in the molten sodium during testing.

The samples are measured for sodium corrosion in terms of discoloration Increased discoloration indicates increased corrosion.

Glasses are tested for resistance towards halide melt at 350° C. and 425° C. for 48 hours. A capsule is designed using Swagelok® parts made of stainless steel, SS304, with compression fitting. An alumina lining is used to contain the halide powder. The composition of the halide melt is $NaAlCl_4$ and loading of the capsule is done inside a nitrogen-filled glove box (moisture <0.1 ppm and oxygen <0.1 ppm). A seal glass piece is loaded inside one the capsule. The glass piece is completely immersed in the molten halide during testing.

TABLE 2

| Halide Corrosion of Sealing Glasses | | |
|---|---|---|
| Samples | 350° C. | 425° C. |
| 5 | 0.037% | 0.11% |
| CE-1 | 0.141% | 0.32% |
| CE-2 | 0.078% | 0.227% |

The sample 5 glass shows reduced halide corrosion at the 350° C. and 425° C. accelerated test.

The halide resistance of glass 5 has more than double the resistance of comparative sealing glasses CE-1 and CE-2.

The singular forms "a," "an" and "the" include plural referents unless the context clearly dictates otherwise. The endpoints of all ranges reciting the same characteristic are independently combinable and inclusive of the recited endpoint. All references are incorporated herein by reference. The modifier "about" used in connection with a quantity is inclusive of the stated value and has the meaning dictated by the context (e.g., includes the tolerance ranges associated with measurement of the particular quantity). "Optional" or "optionally" means that the subsequently described event or circumstance may or may not occur, or that the subsequently identified material may or may not be present, and that the description includes instances where the event or circum-

TABLE 1

| Sample | $SiO_2$ wt % | $Al_2O_3$ wt % | $B_2O_3$ wt % | $Na_2O$ wt % | $ZrO_2$ wt % | CaO wt % | CTE (ppm/° C.)* | Density (g/cm³) | Tg (° C.) | Working Point (° C.) |
|---|---|---|---|---|---|---|---|---|---|---|
| CE-1 | 48 | 24 | 20 | 8 | 0 | 0 | 5.131 | 2.309 | 611.8 | 945.7 |
| CE-2 | 48 | 22 | 20 | 10 | 0 | 0 | 5.96 | 2.393 | 605.1 | 913.2 |
| 1 | 48 | 16 | 20 | 12 | 4 | 0 | 6.734 | 2.433 | 553.8 | 1008 |
| 2 | 46 | 18 | 20 | 12 | 4 | 0 | 6.68 | 2.45 | 554.4 | 1005 |
| 3 | 43 | 15 | 26 | 12 | 4 | 0 | 6.565 | 2.428 | 535.9 | 940.7 |
| 4 | 42 | 15 | 26 | 13 | 4 | 0 | 6.946 | 2.434 | 534 | 927.3 |
| 5 | 62 | 5 | 14 | 8 | 4 | 7 | 6.419 | 2.526 | 587 | 1034 |

*CTE is reported between 20° C. and 350° C.

stance occurs or where the material is present, and instances where the event or circumstance does not occur or the material is not present.

Preliminary and/or transitional chemical changes, transformations, or reactions, if any, that take place in the resulting mixture, solution, or reaction medium may be identified as intermediate species and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The embodiments described herein are examples of compositions, articles, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, articles, and methods that do not differ from the literal language of the claims, and further includes other compositions, articles, and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. An energy storage device, comprising:
an electrochemical cell incorporating a sealing glass consisting of:
silicon dioxide that is present in an amount in a range of from about 30 weight percent to about 70 weight percent;
boron oxide that is present in an amount in a range of from about 10 weight percent to about 40 weight percent;
aluminum oxide that is present in an amount in a range of from about 5 weight percent to about 30 weight percent;
sodium oxide that is present in an amount in a range of from about 4 weight percent to about 16 weight percent;
zirconium oxide that is present in an amount in a range of from about 0.1 weight percent to about 10 weight percent; and
up to about 10 weight percent of one or more alkaline earth oxides.

2. The energy storage device of claim 1 wherein the electrochemical cell contains a first battery component and a second battery component.

3. The energy storage device of claim 2 wherein the first battery component is an electrolyte tube, and the second battery component is a collar.

4. The energy storage device as defined in claim 3, wherein the electrolyte tube comprises beta-alumina and the collar comprises alpha-alumina.

5. The energy storage device of claim 1 wherein the sealing glass consists of:
from about 40 weight percent to about 70 weight percent silicon dioxide,
from about 10 weight percent to about 30 weight percent boron oxide,
from about 5 weight percent to about 20 weight percent aluminum oxide,
from about 4 weight percent to about 15 weight percent sodium oxide,
from about 1 weight percent to about 10 weight percent zirconium oxide, and
up to about 10 weight percent of one or more alkaline earth oxides.

6. The energy storage device of claim 5 wherein the sealing glass consists of:
from about 40 weight percent to about 65 weight percent silicon dioxide,
from about 15 weight percent to about 25 weight percent boron oxide,
from about 5 weight percent to about 20 weight percent aluminum oxide,
from about 6 weight percent to about 15 weight percent sodium oxide,
from about 1 weight percent to about 10 weight percent zirconium oxide, and
up to about 10 weight percent of one or more alkaline earth oxides.

7. The energy storage device of claim 6 wherein the sealing glass consists of:
from about 40 weight percent to about 50 weight percent silicon dioxide,
from about 20 weight percent to about 30 weight percent boron oxide,
from about 10 weight percent to about 20 weight percent aluminum oxide,
from about 10 weight percent to about 15 weight percent sodium oxide,
from about 0.1 weight percent to about 5 weight percent zirconium oxide, and
up to about 8 weight percent of one or more alkaline earth oxides.

8. The energy storage device of claim 1, wherein the alkaline earth oxide is barium oxide.

9. The energy storage device of claim 1, wherein the alkaline earth oxide is calcium oxide.

10. The energy storage device of claim 1, wherein the alkaline earth oxide is strontium oxide.

11. The energy storage device of claim 1, wherein the sealing glass has a coefficient of thermal expansion at a temperature in a range of from about 20 degrees Celsius to about 350 degrees Celsius of from about 5.0 ppm/° C. to about 8.0 ppm/° C.

12. The energy storage device of claim 1, wherein the sealing glass has a glass transition temperature of at least about 500 degrees Celsius.

13. The energy storage device of claim 1, wherein the sealing glass has a glass transition temperature in a range of from about 500 degrees Celsius to about 700 degrees Celsius.

14. A method, comprising:
blending silicon dioxide, boron oxide, aluminum oxide, sodium oxide, zirconium oxide and, optionally, one or more alkaline earth oxides to form a blend consisting of silicon dioxide in an amount in a range of from about 30 weight percent to about 70 weight percent, boron oxide in an amount in a range of from about 10 weight percent to about 40 weight percent, aluminum oxide in an amount in a range of from about 5 weight percent to about 30 weight percent, sodium oxide that is present in a range of from about 4 weight percent to about 16 weight percent, zirconium oxide that is present in a range of from about 0.1 weight percent to about 10 weight percent and up to about 10 weight percent of one or more alkaline earth oxides; and forming a glass seal from the blend to join a first battery component to a second battery component.

15. The method of claim 14, further comprising selecting ingredient amounts for the blend such that the silicon dioxide is present in an amount in a range of from about 40 weight percent to about 70 weight percent, boron oxide is present in an amount in a range of from about 10 weight percent to about 30 weight percent, aluminum oxide is present in an amount in a range of from about 5 weight percent to about 20 weight percent, sodium oxide is present in an amount in a range of from about 4 weight percent to about 15 weight percent, zirconium oxide is present in an amount in a range of from about 1 weight percent to about 10 weight percent and up to about 10 weight percent of one or more alkaline earth oxides.

16. The method of claim 15, further comprising selecting the alkaline earth oxide from the group consisting of calcium oxide, strontium oxide and barium oxide.

17. The method of claim 16, further comprising selecting an additional alkaline earth oxide from the group consisting of calcium oxide, strontium oxide and barium oxide, and adding the additional alkaline earth oxide to the blend.

18. The method of claim 14, wherein blending comprises melt blending.

19. The method of claim 18, wherein melt blending comprises selecting a temperature to be in a range from about 1300 degrees Celsius to about 1700 degrees Celsius.

20. The method of claim 15, wherein selecting the ingredient amounts comprises matching the thermal expansion coefficient of the glass seal to one or both of the first battery component and the second battery component.

21. The method of claim 14, wherein the first battery component is an electrically insulating collar, and the second battery component is an electrically-insulative and ion-conductive electrolyte tube, and the glass seal is a sodium resistant and halide resistant barrier.

* * * * *